(12) United States Patent
Willman et al.

(10) Patent No.: US 7,284,107 B2
(45) Date of Patent: Oct. 16, 2007

(54) SPECIAL-USE HEAPS

(75) Inventors: Bryan Mark Willman, Kirkland, WA (US); Nathan T. Lewis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 10/836,423

(22) Filed: Apr. 30, 2004

(65) Prior Publication Data

US 2005/0246511 A1 Nov. 3, 2005

(51) Int. Cl.
*G06F 12/14* (2006.01)

(52) U.S. Cl. .................................................. 711/170

(58) Field of Classification Search ............. 711/163, 711/169, 170, 116, 144; 714/53; 707/103; 710/36; 713/193, 200
See application file for complete search history.

(56) References Cited

U.S. PATENT DOCUMENTS

| | | | | |
|---|---|---|---|---|
| 5,265,221 A * | 11/1993 | Miller | ......................... | 711/163 |
| 5,432,936 A * | 7/1995 | Gray et al. | .................. | 717/169 |
| 5,590,329 A * | 12/1996 | Goodnow et al. | ........... | 717/144 |
| 5,617,569 A * | 4/1997 | Gray et al. | .............. | 707/103 R |
| 5,644,709 A * | 7/1997 | Austin | ......................... | 714/53 |
| 5,787,309 A * | 7/1998 | Greenstein et al. | ............ | 710/36 |
| 5,802,397 A * | 9/1998 | Greenstein et al. | ............ | 710/36 |
| 5,809,554 A | 9/1998 | Benayon et al. | .............. | 711/171 |
| 6,070,168 A * | 5/2000 | Jacuzio | .................... | 707/103 R |
| 6,275,916 B1 * | 8/2001 | Weldon et al. | ............... | 711/170 |
| 6,643,753 B2 | 11/2003 | Avner et al. | ................. | 711/170 |
| 6,658,652 B1 | 12/2003 | Alexander, III et al. | ..... | 711/128 |
| 6,816,956 B1 * | 11/2004 | Benayon et al. | ............. | 711/170 |
| 2002/0046204 A1 * | 4/2002 | Hayes | ............................ | 707/1 |
| 2002/0055929 A1 | 5/2002 | Kolodner et al. | ............ | 707/103 |
| 2002/0055941 A1 | 5/2002 | Kolodner et al. | ............ | 707/200 |
| 2002/0095453 A1 | 7/2002 | Steensgard | .................... | 709/107 |
| 2002/0194421 A1 | 12/2002 | Berry et al. | ................. | 711/100 |
| 2003/0037248 A1 * | 2/2003 | Launchbury et al. | ........ | 713/193 |
| 2003/0140205 A1 * | 7/2003 | Dahan et al. | ................ | 711/163 |
| 2003/0140244 A1 * | 7/2003 | Dahan et al. | ................ | 713/200 |
| 2004/0015850 A1 * | 1/2004 | Sokolov et al. | .............. | 717/116 |

(Continued)

OTHER PUBLICATIONS

Attardi, G. et al., "Memory Management in the PoSSo Solver", *Journal of Symbolic Computation*, 1996, 21(3), 293-311.

(Continued)

*Primary Examiner*—Matthew Kim
*Assistant Examiner*—Paul Schlie
(74) *Attorney, Agent, or Firm*—Woodcock Washburn LLP

(57) ABSTRACT

Special purpose heaps are created to store different classes of data to which different rules apply. A library of functions is provided which is designed to respect the different classes of rules that apply to the different heaps, by storing data only on a heap that is designated for use with the proper class of data, and by resisting the performance of actions on data in a heap that is inconsistent with the rules that apply to the heap. The use of plural heaps in this manner discourages programmer error in which an operation is performed on data that is inconsistent with the data, since the programmer would explicitly have to copy data from one heap to the other in order to perform the action. In one example, one heap is designated for the storage of secret data, and another heap is designated for general-purpose (non-secret) data.

25 Claims, 4 Drawing Sheets

U.S. PATENT DOCUMENTS

2004/0068725 A1* 4/2004 Mathiske et al. .............. 718/1
2004/0123118 A1* 6/2004 Dahan et al. ............... 713/189
2004/0221120 A1* 11/2004 Abrashkevich et al. ..... 711/170
2004/0230762 A1* 11/2004 Allen et al. ................. 711/170
2004/0243833 A1* 12/2004 Spacey ....................... 713/200

OTHER PUBLICATIONS

Attardi, G. et al., "Customising Object Allocation", *Lecture Notes in Computer Science, 8th European Conference, ECOOP*, Jul. 4-8, 1994, 320-343.

* cited by examiner

Secret Management API - 302

```
SECRET *createkey();

void sign(SECRET *secret, char *hash);

void decrypt(SECRET *secret, char *ciphertext, char *cleartext);

.
   .
   .
```

Other API - 304

```
void printf(char *format, ...);

void transmit(void *data, int data_size, ULONG ip_address);

# SPECIAL-USE HEAPS

FIELD OF THE INVENTION

The present invention relates generally to the field of computing, and, more particularly, to the use of plural heaps to manage data that is subject to different anticipated, expected, or required uses.

BACKGROUND OF THE INVENTION

In a typical computing environment, programs that are running can generate or receive data that needs to be stored. A portion of memory referred to as a "heap" is used to store such data. Typically, a program that needs to perform dynamic memory allocation loads a library of memory management functions shortly after the program is started. The library then requests a large block of memory from the operating system to form the heap, and the program calls a routine from the library to request an allocation of some number of bytes of memory. The library services the program's request by providing bytes of memory from the heap.

Normally, the program has one heap. The heap may be expanded or contracted depending on the needs of the program, but it is typical for all memory in the heap to be a single, undifferentiated class that encompasses all data for which space is dynamically allocated—i.e., there is no attempt to discriminate between different locations within the heap as to what can be stored at a particular location, or what can be done with a piece of data stored at a particular location.

Certain types of data may fall into different classes that suggest limits on the way in which the different classes of data should be used. For example, data may be classified as secret or non-secret, where "secret" data would include cryptographic keys, passwords, etc. It is quite common to send non-secret data outside of a program's address space to a venue such as a file, a network, etc. While secret data can also be sent outside of the program's address space, the sending of secret data should be done only under very limited circumstances. One class of security breach is the case where secret data is inadvertently sent out into the public due to programmer error. Since conventional systems store secret data in the same heap as any other data, there is no way to determine from a datum's location whether it secret or not.

In view of the foregoing, there is a need for a mechanism that overcomes the drawbacks of the prior art.

SUMMARY OF THE INVENTION

The present invention provides for the use of plural heaps to store different classes of data. Library functions that are available to programmers for building applications are designed to allocate data to a particular heap depending upon what type of data is being stored. Moreover, the library functions are designed not to copy data from one heap to another. Data can be copied from one heap to another if an explicit instruction to do so is issued, but there is a relatively low chance that a programmer would issue such an instruction by mistake. Thus, inadvertent leakage of secret data is greatly diminished.

In a preferred embodiment, two heaps are allocated—one heap for general data, and the other heap for secrets (e.g., cryptographic keys, passwords, etc.). Library functions that create, manage, or otherwise store secrets allocate memory from the heap of secrets in order to store such secrets. Since the virtual address ranges of the memory pages that make up the heap of secrets are known, it can easily be determined from any given memory address whether the data contained at that address is, or is not, part of the heap of secrets. Thus, other functions in the library are designed not to perform certain action with data that is stored in a location that is known to be part of the heap of secrets. (E.g., a function that sends data over a network can be configured not to send the data if an attempt is made to send data that is located on the heap of secrets. As an alternative to refusing to send the data, the function could be configured to issue a warning to the user if an attempt is made to send secret data over the network, and to give the user the option of aborting the send, as long as the relevant security model assumes that the user has an incentive to prevent secret leakage.) It is always possible to copy data explicitly from one heap to another, but since an instruction to perform such a copy would have to be made explicitly (i.e., the library functions would not transfer data from one heap to the other behind the scenes without the programmer's knowledge), protection of the secret data stored in the heap lies in the fact that secrets can be copied out of the heap only upon a reasonably reliable indication of the programmer's intent to do so.

The use of plural heaps is not limited to two heaps for secret and non-secret data. More generally, any number of heaps can be designated for any number of classes of data. In some cases, the different classes of data may include different classes of secrets—e.g., one heap for political party secrets, and another heap for medical secrets; or, as another example, encrypted E-mail may be categorized in different classes, and different heaps may be used to protect the various different secrets that protect each class. Any number of different types of classes may exist, and the invention is not limited to any particular way of classifying data, or any particular number of classes. In general, each class may have its own rules as to what can, or cannot, be done with the data in that class, and the library of functions can be designed to obey those rules with respect to the heaps.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings:

FIG. 4 is a block diagram of Application Programming Interfaces (APIs) that provide access to different heaps, in accordance with aspects of the invention.

DETAILED DESCRIPTION OF ILLUSTRATIVE EMBODIMENTS

Overview

The present invention provides a mechanism whereby different classes of data are stored on different heaps. Functions that handle the different classes of data can be configured to write data from each class only to the appropriate heap (or to read data that is supposed to belong to a particular class only from a particular heap), and to honor the rules governing a particular heap when using the data from that heap. For example, two heaps can be created for storing secret and non-secret data respectively. Functions can be configured to store all secrets on the secret heap, and to refuse to write out data from the secret heap to any non-secure location. As another example, one heap can be designated to store data that has been subjected to certain standards of non-corruption (e.g. "trusted" data), and a function that uses and relies on such data can be configured to receive data only from that heap in order to prevent its input data from being corrupted. Conversely, a function can be configured to refuse to write untrusted data (e.g., data from an untrusted source, or data that was otherwise created or obtained in some manner that does not meet the applicable standard of trust) onto the trusted heap, thereby preserving the integrity of the data on that heap. In other words, rules on the separation of different memory regions (such as different heaps) can be used to keep secret data from getting out, as well as keeping bad data from getting in. In general, different heaps can be used to store data that is subject to particular rules about that data, and functions can be configured to honor those rules by only using (i.e., reading and writing) the heaps in a manner that will respect those rules.

Exemplary Computing Arrangement

Figure 1:
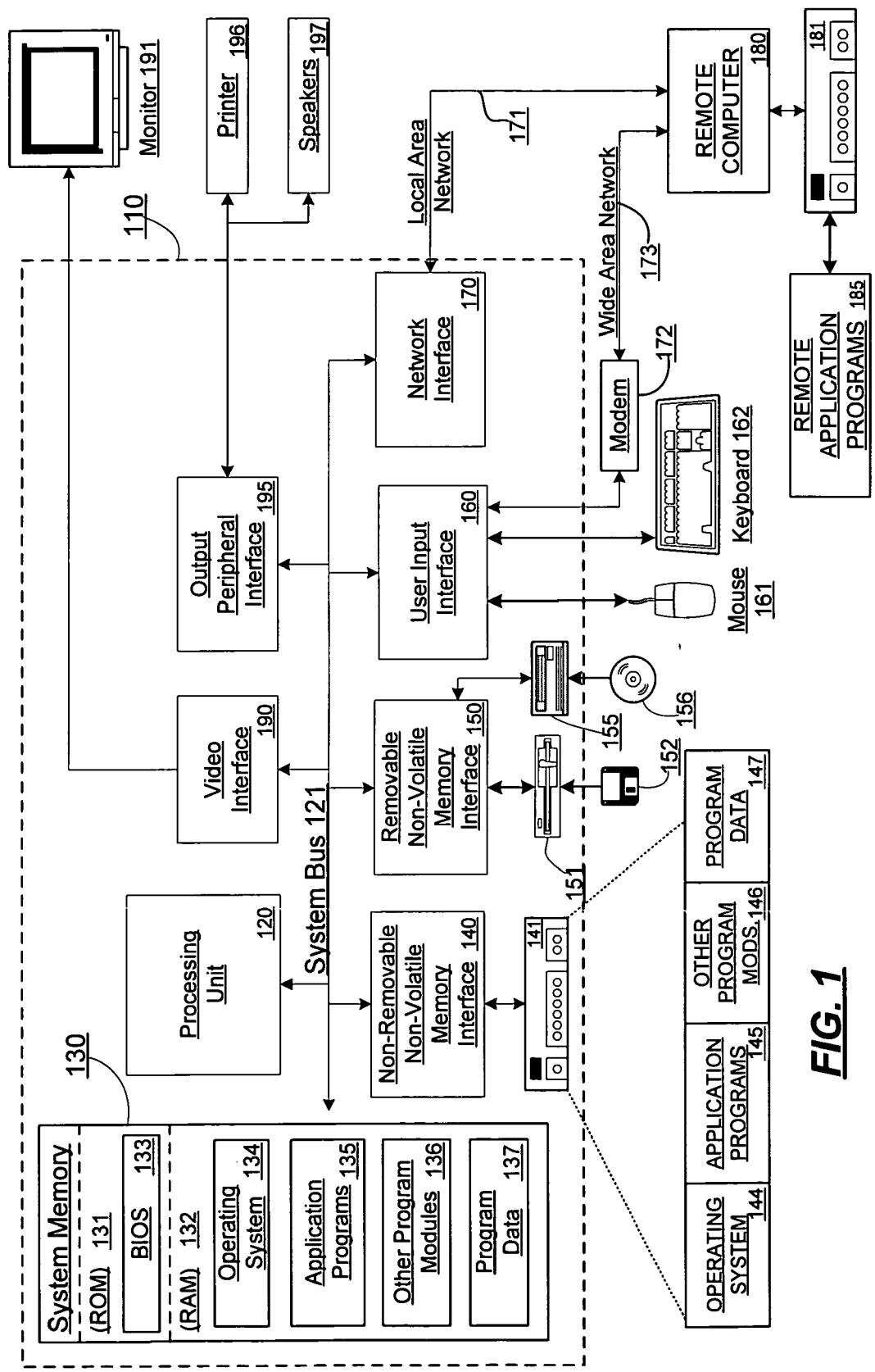
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Heaps

Figure 2:
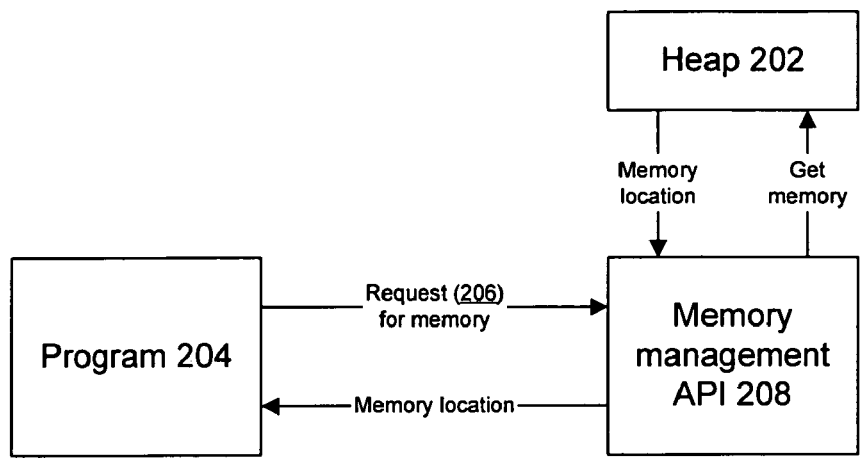
FIG. 2 is a block diagram of a heap, from which memory for an executing program may be allocated.

During the execution of a program, it may be necessary to allocate memory for the storage of data. As is known the art, a "heap" is one or more blocks of memory that has been designated to be parceled out in order to satisfy such memory allocation requests. Typically, the program uses a library routine to request a quantity of memory; the library routine then allocates the memory from a heap and returns the address of the memory that has been allocated. FIG. 2 shows how a program obtains memory allocations from a heap.

Program 204 is a program that executes in a computer environment. During its execution, program 204 may require memory to store some type of data. The memory for the entire operating environment is parceled out by the operating system, and program 204 could use a system call to request a memory allocation directly from the operating system. However, it is more common for program 204 to use a standard library of functions, such as memory management API 208, to request the memory.

When program 204 requires memory, program 204 issues a request 206 to memory management API 208 in order to request the quantity of memory required. Request 206 generally takes the form of a call to a function exposed by memory management API 208 (e.g., malloc(size)). Memory management API 208 then locates, within heap 202, a contiguous block of unallocated memory of the specified size, and returns the base address of this block of memory to program 204.

Heap 202 is one or more blocks of memory—typically large blocks of memory—that are managed by memory management API 208. Memory management API 208 obtains the memory for heap 202 by requesting one or more allocations from the operating system. Although, as noted above, it is possible for a program to request each memory allocation from the operating system directly, it is generally more efficient to use a memory management API 208 that obtains large blocks of memory (i.e., heap 202) to be parceled out to program 204 on an as-needed basis, since this technique reduces the number of (expensive) system calls. Additionally, memory management API 208 can efficiently manage the memory in heap 202 by using techniques that tend to resist fragmentation, and by performing garbage collection. Moreover, since all memory that is allocated to program 204 through memory management API 208 are located in heap 202, ail such memory is known to fall within one or more well-defined address ranges. As discussed below, the ability to identify memory as being on a particular heap based on whether the memory falls within a particular range of addresses is used advantageously to distinguish between different types of data that may need to be handled in different ways or according to different rules. It should be noted, however, that the ability to enforce the separation of data based on which heap the data is located in is not limited to the case where such enforcement is performed only by a memory management API; in a preferred embodiment, all functions that manage memory—whether part of the memory management API, any other API, or the operating system (e.g., the underlying memory allocation functions of the operating system)—will be configured to enforce the separation of different classes of data into different heaps.

Use of Plural Heaps to Manage Different Types of Data

Figure 3:
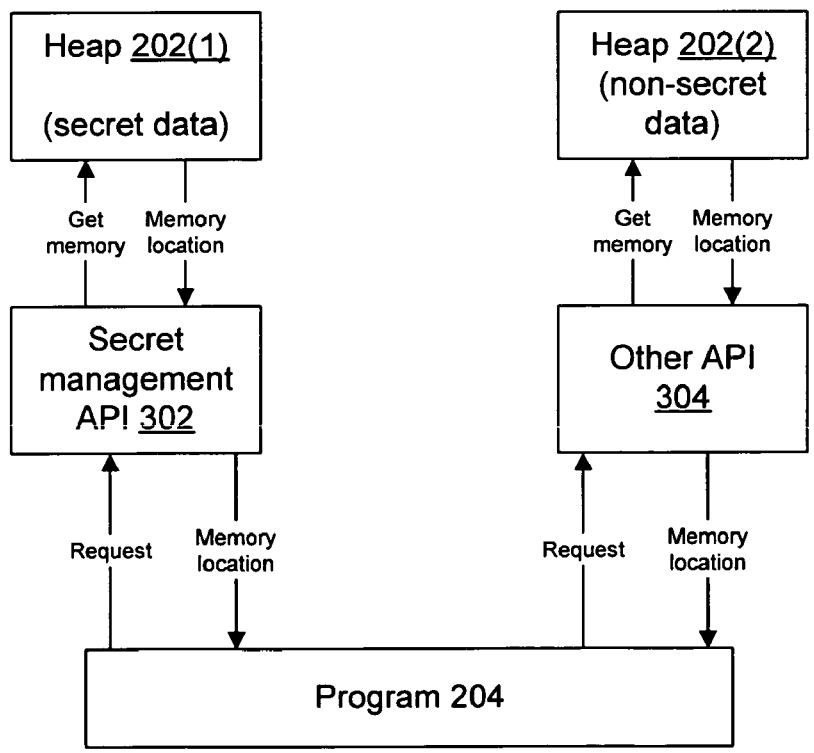
FIG. 3 is a block diagram of an environment in which plural heaps are available for an executing program.

FIG. 3 shows a scenario in which two different heaps 202(1) and 202(2) are maintained to manage different types of data. In this example, heap 202(1) is used to manage "secret" data, and heap 202(2) is used to manage other data.

"Secret" data is data that should generally not be disseminated, or should be disseminated only under very specific conditions. Cryptographic keys are examples of secret data.

In one example, heaps 202(1) and 202(2) are allocated by two different APIs—one that performs operations on secrets, and the other that does not. (Alternatively, there could be a single API that uses both heaps, and performs some operations on secrets and some operations on non-secrets.) In the example of FIG. 3, there is a secret management API 302, and an "other" API 304. For example, secret management API 302 may expose functions that generate cryptographic keys, or that use such keys for encryption, decryption, digital signatures, etc. "Other" API 304 may perform other functions that do not relate to the management of secrets—e.g., input/output, sorting, mathematical calculations, or any other type of functions. Secret management API 302 maintains heap 202(1) to store secret data. "Other" API 304 maintains heap 202(2) to store non-secret data. For example, when secret management API 302 creates a cryptographic key and needs space to store the key, it obtains the memory to store the key from heap 202(1). When "other" API 304 needs memory (e.g., an i/O buffer), it obtains the memory from heap 202(2). In the example of FIG. 3, APIs 302 and 304 are shown as separate APIs, although, as noted above, the secret management there could also be a single API that performs both secret management and other functions; such an API could maintain two heaps 202(1) and 202(2), and could use the different heaps depending on the type of data that a particular function is storing.

Program 204 can invoke either API 302 or API 304, by calling a function that either of the APIs exposes to program 204. If the function that is called results in a memory allocation, the called function will be configured to allocate memory from the appropriate heap.

As noted above, when a heap is used to allocate memory, memory from the heap can be identified because it will fall within the range of addresses that are known to constitute the heap. Similarly, when two heaps are used, the address ranges that make up each heap are known, so a given address can be identified as being from one heap or the other (or from neither heap, in the case of memory that is not allocated from any heap). This ability to identify which of the two heaps a particular memory location comes from essentially defines two different classes of data, and this differentiation can be used advantageously to apply different rules to the different classes of data. For example, APIs 302 and 304 can both be configured to understand that a secret should not normally be sent out on an I/O device. (E.g., sending a secret cryptographic key to a network port may represent abnormal behavior.) Thus, the functions that make up the APIs can be configured to recognize when data on the secret heap is being used in an abnormal manner simply by checking where the data is located, and those functions can be configured to behave appropriately (e.g., by raising alarms, rendering a warning message, or refusing to perform the requested task). For example, a function that takes an address as an argument, and that writes the contents of that address to an I/O device, can be configured to compare the address to the known address range of the secret heap; if the address is part of the secret heap, the function can refuse to perform the write.

It should be noted that, while the functions of APIs 302 and 304 may be configured to prevent misuse of the data in secret heap 202(1), it is still possible for a programmer to transfer data from one heap to another. E.g., if a is an address on secret heap 202(1), and b is an address on non-secret heap 202(2), a programmer can always execute an instruction such as:

*b=*a (which, in this example, is in the C programming language). This instruction will have the effect of copying secret data to the non-secret heap. However, even though such an instruction can be issued, configuring the APIs so that they are not complicit in the misuse of data on the secret heap forces the programmer to make explicit his intention to transfer data off the secret heap. This requirement that the programmer transfer data explicitly has the beneficial effect of reducing programmer error by forcing the programmer to openly acknowledge his or her intent to treat a secret as a non-secret.

It should be noted that, while FIG. 3 shows the case of two heaps—one that is used to store secrets, and one that is used to store non-secrets—in greater generality a system can be configured to maintain any number of heaps, where different sets of rules apply to the different classes of data stored in the heaps. The API(s) can be configured to recognize which heap any data is stored on, and to follow whatever rules apply to that class of data.

Example APIs to Enforce Heap Rules

FIG. 4 shows an example of the functions exposed by APIs 302 and 304, which may be used to enforce the different rules that apply to different heaps. In the example of FIG. 4, API 302 exposes the functions that operate on the secret heap 202(1), and API 304 exposes functions that operate on other data (i.e., data stored in non-secret heap 202(2), or stored in other locations that are not part of secret heap 202(1)).

For example API 302 exposes functions relating to cryptographic keys—e.g., createkey( ), applysecret( ), and decrypt( ). The createkey( ) function may, for example, allocate a portion of memory from secret heap 202(1) that is large enough to store data of type "SECRET," create a key, store the key in the allocated memory, and return a pointer to the stored secret. The sign( ) function may take a pointer to a secret and a pointer to a hash as an argument, compute a digital signature based on the hash and the secret, and write the signature to a known location. The decrypt( ) function may take, as arguments, a pointer to a secret, a pointer to a character string that contains ciphertext, and a pointer to a location in which the decrypted ciphertext ("cleartext") will be written, and may then use the secret to decrypt the ciphertext into the location provided for cleartext. In one embodiment, the decrypt( ) function may not care where the ciphertext was located, but may require that the cleartext be located on a heap that has been designated for secrets (thereby preventing the cleartext from being used indiscriminately). All of these functions make appropriate use of secrets—i.e., they create or use secrets, but do not transmit the secrets over I/O devices. ("Appropriate" means "in compliance with whatever rules apply to the heap"; as noted above, the invention is not limited to the case where the special heap stores secrets, and is not limited to the case where the rule that applies to that heap is to avoid transmitting a secret over an I/O device.)

By contrast, API 304 exposes functions that operate on data in general—e.g., printf( ), which formats data and writes it to the standard output stream, or transmit( ), which transmits arbitrary data to a specified IP ("Internet Protocol") address. When these functions are passed memory addresses as arguments, they may be configured to determine whether or not the address falls within a range that is part of secret heap 202(1). If the address falls within any such range, the functions can be configured to behave appropriately as described above (e.g., raising a warning, refusing to perform the requested task, etc.).

As described above, it is not necessary to categorize functions that perform operations on secrets, and functions that do not, into separate APIs. In many cases, an API will contain functions that perform some operations on secrets and some operations on non-secrets; such functions can use both the secret and non-secret heaps, according to the type of data on which they are operating.

Example Process for Using a Special Heap

Figure 5:
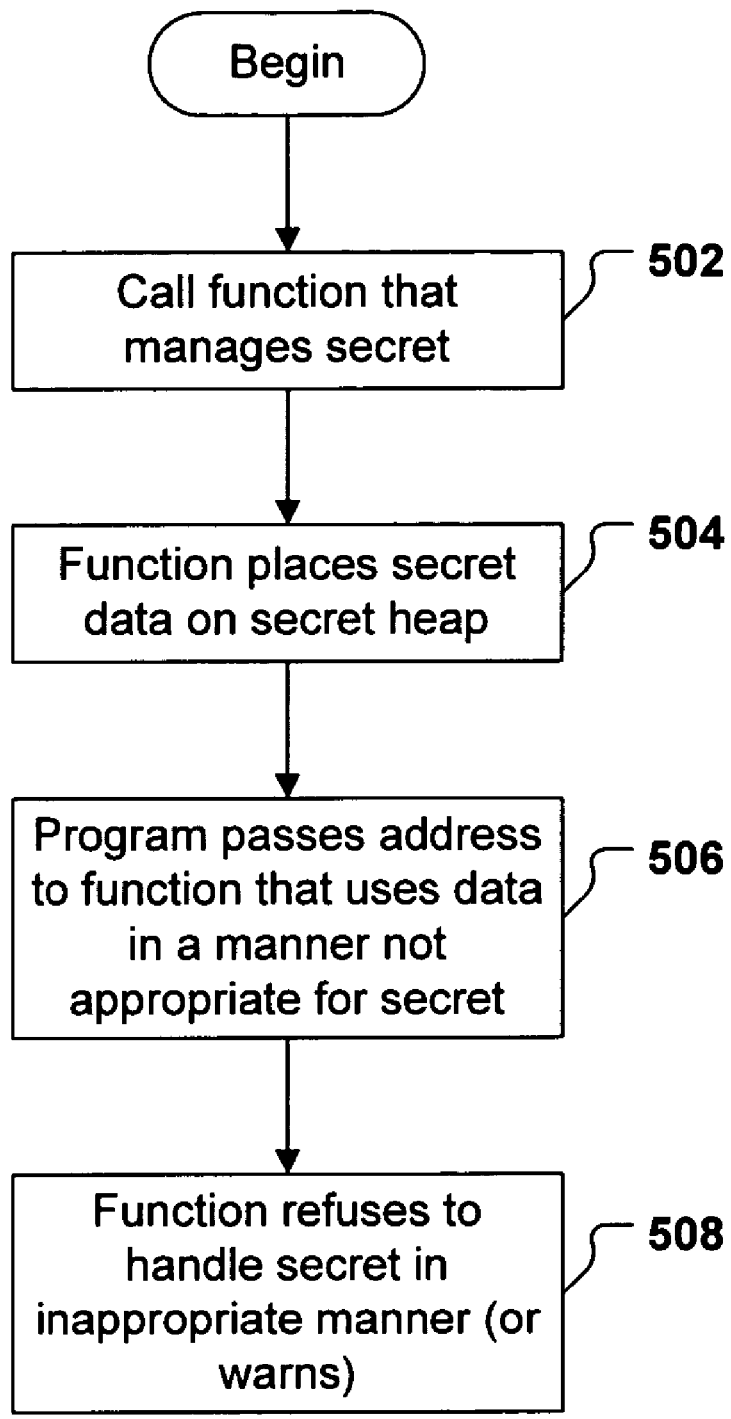
FIG. 5 is a flow diagram of a method of using a special heap in accordance with aspects of the invention.

FIG. 5 shows an example process that may take place when a special heap is used. FIG. 5 shows an example in which there are two heaps—one for secrets, and one for other data—although, as described above, the invention is not limited to the case where there are two heaps, or where one heap is designated for the storage of secrets.

Initially, a program makes a call to a function that manages a secret (502)—e.g., the createkey( ) function described above. The program then allocates a place for the data on the secret heap, and stored the data in the allocated location (504). At some subsequent point in the program, the program passes an address to a function that uses the contents of the address in a manner that is not appropriate for a secret (506)—e.g., the program may pass an address to the printf( ) function. The function that is called then checks the address to determine whether the address is part of the secret heap. If the address is not part of the secret heap, then the function performs the requested action normally. If the address is part of the secret heap, then the function takes appropriate action (508)—e.g., warning the user of the action that is about to be taken, refusing to perform the function, etc.

Example Scenarios and Usages

In secure computing systems, such as Microsoft's Next Generation Secure Computing Base (NGSCB), it may be beneficial to think explicitly about which information in a program is sensitive, and which came from an untrusted source and must be handled very carefully, since it might have unexpected contents (such as an exploit attempt). There are at least two classes of problems that are desirable to prevent 1) traditional buffer overruns, in which an oversized packet damages the execution stack and causes improper code to run, and 2) programmer errors in which some secret is copied out of protected space. These problems are preventable by providing several different heaps for applications to allocate from, and only allowing certain types of data transfers into allocations that came from the correct heap.

Normally, system services that move data out of a process's space (write to a file or the network, do inter-process-communication, etc) cannot tell which data addresses in the caller's address space are "reasonable" or "safe" to be exposed in this way. As discussed above, the present invention provides a way for programs to segregate particularly important secret data in a region that the system can identify. Thus, the present invention allows the system (and system services) to "help" the program not leak secrets, and also reduces the chance that secrets will be broadcast due to programmer error. In other words, the invention makes it harder to write code that accidentally leaks secrets.

In a preferred embodiment, memory allocation functions require the caller to explicitly specify which heap their allocation should come from. Since the system knows the virtual address ranges of each heap, each system service can refuse to perform inappropriate actions on data. In one embodiment, virtual address ranges for each heap can be reserved at the time that an NGSCB trusted agent is started; if necessary, the sizes of the heaps can be adjusted at startup time based on information accompanying the executable image. For example, a function that transfers data out of protected space, such as by writing to an unencrypted file on the Windows filesystem, can refuse to copy out of a buffer that could contain decryption keys; similarly, a function that transfers data into protected space can refuse to write data into the protected space that comes from an untrusted source, or that was created under circumstances that fail to guarantee that the data will meet whatever standard applies to the protected space, thereby preserving the integrity of the data in the protected space. A function that encrypts data could refuse to run if the provided key is not in the heap designated to store trusted data. A function that retrieves keying material from secure storage or a key pair generator can insist that the values they write go into the heap designated to store the secrets. A function that handles data that has no particular assurance of trustworthiness can refuse to write that data into a heap reserved for trusted data. The common theme among these examples is that different functions can make assumptions about the type of information that will be in certain parameters, and it's not possible for a program to leak information by, say, retrieving a key into a buffer and then sending that buffer out over a socket, or to corrupt a protected heap by writing untrusted data into that heap. As discussed above, a program can do this purposefully, but the above-described mechanisms resist such actions being performed due to error or accident.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A system for managing at least two different classes of data, wherein at least one of the classes is a class that comprises a cryptographic key, the system comprising:

one or more memory management components that create plural heaps, there being different sets of rules regarding use of data on each of the heaps, wherein said plural heaps comprise a first heap, said sets of rules calling for said cryptographic key to be stored on said first heap and further comprising a first rule that data on said first heap not to be transferred out of the system through an output device, said one or more memory management components exposing functions for use by a program, said functions including a first function to create a cryptographic key, said functions being configured to store and/or consume data, said functions further being configured to: (1) determine which of said heaps to store data in based on the nature or intended use of the data, including determining that said cryptographic key created by said first function is to be stored on said first heap; and (2) determine whether a request to transfer an item of data out of the system through said output device is consistent with the rules applicable to the item of data based on which heap the item of data is located on; wherein each of said plural heaps is stored within one or more ranges of memory locations, said ranges being known to said one or more components, wherein said functions determine which of said plural heaps a given datum is located on based on which of the ranges the address of said datum falls into; and wherein said functions take one or more measures to prevent violation of the rules applicable to each of the heaps, said one or more measure comprising one or more of: raising an alarm, rendering a warning message, and refusing to perform said requested use of data.

2. The system of claim 1, wherein said plural heaps further comprise a second heap, said first heap being designated to store data whose use is in some manner restricted, said second heap being designated to store data whose use is not restricted.

3. The system of claim 2, wherein said first heap stores data which is to be kept secret.

4. The system of claim 3, wherein a second of said functions comprises an output function, and wherein the second function takes one or more measures to prevent output of data stored on said first heap.

5. The system of claim 3, wherein said data which is to be kept secret comprises one or more cryptographic keys.

6. The system of claim 3, wherein said data which is to be kept secret comprises decrypted ciphertext.

7. The system of claim 1, wherein said one or more components consists of one component.

8. The system of claim 1, wherein said one or more measures comprise refusing to perform an action on a datum that is inconsistent with the rules applicable to the heap on which said datum is stored.

9. The system of claim 1, wherein said one or more measures comprise generating a warning that an action has been requested to be performed on a datum that is inconsistent with the rules applicable to the heap on which said datum is stored.

10. A computer-storage medium encoded with computer-executable instructions to perform a method comprising:
creating a plurality of heaps, each of the heaps corresponding to a different class of data, wherein at least one of the classes is a class that comprises a cryptographic key;
receiving a first request to perform a first function that creates and stores first data belonging to a first class, said first data comprising a cryptographic key;
allocating a first portion of memory from a first of said heaps;
storing said first data in said first portion of memory;
receiving a second request to perform a second function that, if executed, transfers data stored in said first portion of memory through an output device;
disallowing said second request from proceeding based on a determination that one or more rules prohibit the transfer of data stored in said first of said heaps from being transferred through said output device, said determination being based on a comparison of the location of said first portion of memory and ranges of memory addresses in which said first of said heaps is stored, said disallowing comprising one or more of: raising an alarm, rendering a warning message, and refusing to transfer data through said output device.

11. The computer-storage medium of claim 10, wherein said plurality of heaps comprises said first of said heaps and a second of said heaps, said first of said heaps corresponding to a class of data that is to be kept secret, said second of said heaps corresponding to a class of data that does not need to be kept secret.

12. The computer-storage medium of claim 10, wherein said first function performs the storage of a secret at said first portion of memory, wherein said second function receives an address of said first portion of memory and is configured to perform an act on data stored at the received address that would disclose the contents of the received address, said second function being configured to resist performing said act if said received address is located on said first heap.

13. The computer-storage medium of claim 12, wherein said act comprises writing the contents of the received address to an output device.

14. The computer-storage medium of claim 10, wherein said at least one action in resistance of said second request proceeding comprises refusing to carry out said second request.

15. The computer-storage medium of claim 10, wherein said at least one action in resistance of said second request proceeding comprises generating a warning prior to carrying out said request.

16. A method of protecting data from misuse comprising:
providing a first set of functions that handles first data that belongs to a first class, said first class comprising a cryptographic key, a first one of the first set of functions creating said cryptographic key and storing said first data, including said cryptographic key, on a first heap;
providing a second set of functions that handle second data in a manner that is inconsistent with a set of rules that applies to said first class, said second set of functions storing said second data on a second heap, said second set of functions being configured to take at least one measure to prevent the copying of said data on said first heap to said second heap, and further being configured to recognize whether said data is located on said first heap based on a comparison of a location of said first data and a range of memory locations designated to store said first heap, and further being configured to take at least one measure to resist the use of data on said first heap in a manner that is inconsistent with the set of rules that applies to said first class, said one or more measures comprising one or more of: raising an alarm, rendering a warning message, and refusing to transfer said data from said first heap to said second heap.

17. The method of claim 16, wherein said set of rules that applies to said first class comprises a requirement that data in said first class be kept secret, and wherein said second class comprises non-secret data.

18. The method of claim 16, wherein said set of rules that applies to said first class comprises a rule that data in said first class should not be transmitted over an output device.

19. The method of claim 16, wherein said first set of functions comprises functions that create or apply cryptographic keys, and wherein data in said first class comprises one or more cryptographic keys.

20. The method of claim 16, wherein said one measure to prevent the copying of said data on said first heap to said second heap comprises determining whether data to be copied to the second heap is located in the first heap and refusing to perform the copy if said data to be copied is located in the first heap.

21. The method of claim 16, wherein said at least one measure to resist the use of data on said first heap in a manner that is inconsistent with the set of rules that applies to said first class comprises refusing to perform a requested use of data located on said first heap.

22. The method of claim 16, wherein said at least one measure to resist the use of data on said first heap in a manner that is inconsistent with the set of rules that applies to said first class comprises generating a warning prior to performing a requested use of data located on said first heap.

23. A computer-storage medium encoded with computer-executable instructions to perform a method comprising:
    creating a plurality of heaps, each of the heaps corresponding to a different class of data, wherein at least one of the classes is a class that comprises a cryptographic key;
    receiving a request to perform a function that involves a usage of a portion of memory, said portion of memory being located in a first of said plurality of heaps, said portion of memory storing said cryptographic key;
    either allowing the request to proceed, or performing at least one action in resistance of said request proceeding, according to whether said usage is consistent with rules governing said first heap, a determination of whether to allow the request to proceed or to perform at least one action in resistance of said request proceeding being based on whether said action either would transfer said cryptographic key from said first of said plurality of heaps to a second one of said plurality of heaps, or would transfer said cryptographic key through an output device, said determination identifying said cryptographic key as being stored on said first heap based on a comparison of a location in memory of said cryptographic key with a range of memory locations designated for storage of said first of said plurality of heaps, said one or more actions in resistance of said request proceeding comprising one or more of: raising an alarm, rendering a warning message, and refusing to perform a user sought in the request.

24. The computer-storage medium of claim 23, wherein said usage comprises writing data to said first portion of memory, and wherein said rules govern either what type of data may be stored on said first heap or under what circumstances data may be written to said first heap.

25. The computer-storage medium of claim 23, wherein said usage comprises reading data from said first portion of memory, and wherein said rules govern either what type of usage may be made of data stored on said first heap, or under what circumstances data may be read or used from said first heap.

* * * * *